May 22, 1951     R. STEVENSON     2,554,390
HYDRAULIC FUSE
Filed July 26, 1944
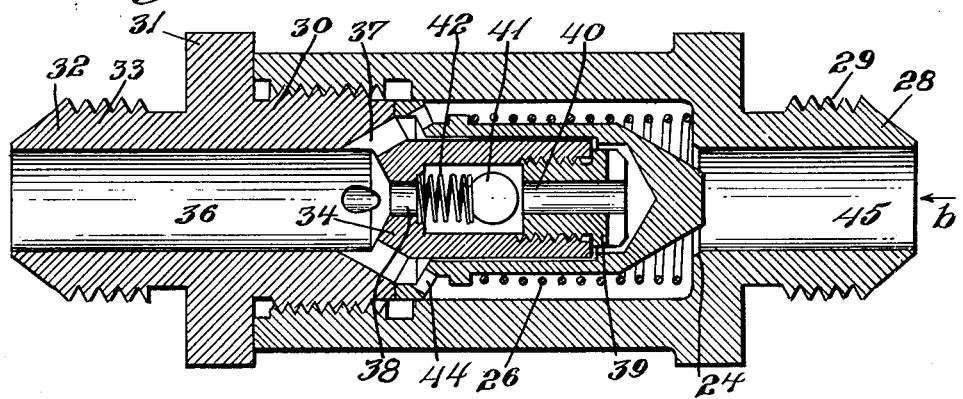
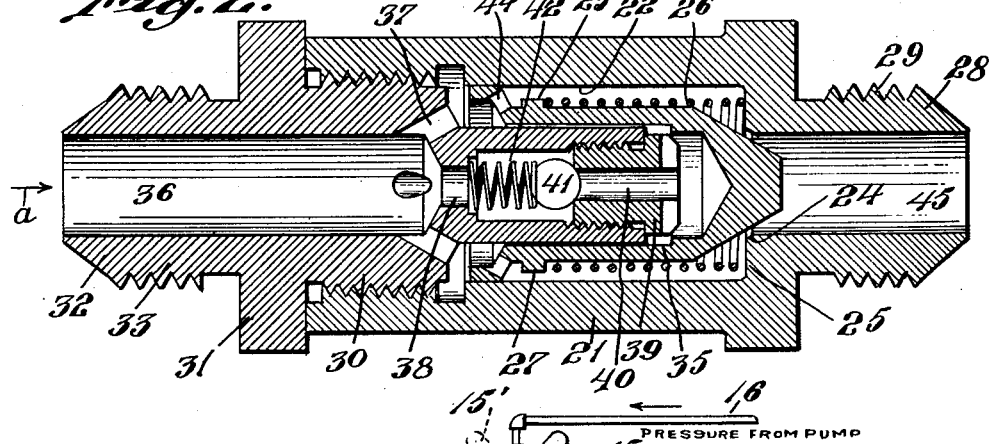
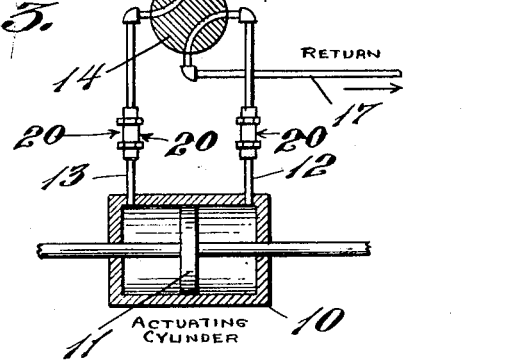
INVENTOR
Robert Stevenson
BY Barlow & Barlow
ATTORNEYS Patented May 22, 1951

2,554,390

UNITED STATES PATENT OFFICE 2,554,390

HYDRAULIC FUSE

Robert Stevenson, Barrington, R. I., assignor to Merit Engineering, Inc., a corporation of Rhode Island Application July 26, 1944, Serial No. 546,600

4 Claims. (Cl. 137—153)

This invention relates to a hydraulic fuse to be inserted in the two-way flow line of fluid so as to limit the loss of fluid should a leak of substantial volume or break occur in the fluid flow line.

Another object of this invention is to provide an orifice which will permit operation of the closure valve and yet will provide a sufficient space so that it cannot easily become clogged with dirt or the like.

Another object of this invention is to provide a valve which may be made short and compact so that it will not occupy an excessive amount of space.

Another object of this invention is to provide a quick relief for the valve when fluid starts to flow in the opposite direction in the conduit that the valve may open quickly and provide a minimum obstruction of flow.

With these and other objects in view, the invention consists of certain novel features of construction, as will be more fully described and particularly pointed out in the appended claims.

In the accompanying drawings:

Fig. 1 is a sectional view illustrating the valve in the body in open position with the parts shown when flow is provided so as to unseat the valve;

Fig. 2 is a sectional view illustrating the valve as moved to a position near its seat;

Fig. 3 is a diagrammatic view in section illustrating the position of two fuses in a hydraulic circuit.

In proceeding with this invention I provide a body and a valve which has a bore with a stem extending into this bore to substantially close it but still leave an annular orifice into which fluid may flow. The stem also is provided with a conduit which is controlled by a valve of the relief type which will prevent flow of fluid when the valve is closed but will permit the valve to quickly open when the main valve moves toward open position or away from its seat.

With reference to the drawings and particularly Fig. 3 10 designates an actuating cylinder having a piston 11 therein with a fluid conduit 12 to one side of the piston and a fluid conduit 13 to the other side of the piston. As the piston is moved in one direction liquid is forced out of the cylinder through the other supply line and vice versa. The supply lines are controlled by a valve 14 and handle 15 which in the position illustrated in full line directs pressure from the pump through the conduit 16, and through the conduit 13 to the cylinder, while the conduits 12 and 17 provide for a return through the valve. If the valve is moved so that the handle is in the dotted line position shown at 15' fluid is forced in through the conduit 12 and the conduit 13 is connected to the return 16.

If a break or substantial leak should occur in the connection to the actuating cylinder, in order to prevent an excess loss of fluid, fuses designated 20 are inserted in the conduits 12 and 13. Each of these fuses are of the same construction and are shown in greater detail in Figs. 1 and 2 on a larger scale.

The fuse consists of a body 21 having a bore 22 along which the valve 23 may slidably move and be guided by this bore 22. A valve seat 24 is provided on the shoulder 25 while a spring 26 engages this shoulder and a flange 47 on the valve to force the valve away from its seat 24. A nipple 28 on the end of the valve body is threaded as at 29 for connection to the conduit in which it is to be assembled. This cup-shaped body 21 is closed by a member 30 having a flange 31 to engage the end of the cup body. This member also is provided with a nipple 32 threaded as at 33 for connection in the pipe line. This member 30 is provided with a stud 34 which extends into the bore 35 of the valve 23 and is so proportioned as to size that it provides an annular clearance with this bore 35 which will permit a predetermined amount of liquid to slowly enter the bore of the valve. This member 30 provides a conduit 36 having channels 37 for the passage of fluid from the conduits 36 to and around the stud 34. A central conduit 38 also passes through this stud 34 and is reduced by a plug 39 having an opening 40 therethrough. A ball valve 41 is urged by the spring 42 to close this bore 40.

The guiding flange of the valve 23 is provided with a plurality of openings 44 to permit the fluid which passes through the conduit 36 and through the openings 37 to pass about the outside of the valve through the openings 44 and then on through the body.

In operation when fluid enters the conduit 36 as designated by the arrow a in Fig. 2 fluid passes about the valve and out through the conduit 45. Some of the fluid, however, will enter the annular space between the stud and the bore of the valve 23 as the pressure maintains the ball 41 on its seat. This fluid gradually enters and when the bore is filled the valve will start to move toward its seat. However, the annular space about the stud is so determined that the valve will not completely close during ordinary working time that fluid moves in the system in the direction of the arrow a before the pressure is stopped or the flow reverses. If, however, the system is broken, then the valve will continue to move to its seat and close the circuit preventing excess loss. When it is desired that the fluid in the circuit move in the opposite direction and the fluid enters in the direction of *b* as shown in Fig. 1, the pressure of spring 26 with the fluid pressure unseats the valve or moves it away from its seat. The pressure in the conduit 36 will be less than the pressure on the opposite side of the ball tending to unseat the ball as shown in Fig. 1 and permit a quick relief of the fluid which has been pocketed or located in the bore of the valve 23. This way the valve 23 moves quickly from a location near closed position.

By the above arrangement it will be apparent that should a break occur in the line the hydraulic fluid will be limited in the escape that may occur.

I claim:

1. In a hydraulic fuse, a body member providing a valve seat, a valve for said seat spring biased to open position and having a central bore closed at the inner end thereof providing a surface subjected to fluid pressure tending to seat said valve, means providing a controlled entrance for supplying fluid pressure into said bore to act against said surface, said valve being moved toward its seat by fluid pressure acting on said surface.

2. In a hydraulic fuse, a body member providing a valve seat, a valve for said seat spring biased to open position and having a central bore closed at the inner end thereof providing a surface subjected to fluid pressure tending to seat said valve, a stud fixed to said body and extending into said bore and providing an annular clearance therefrom to provide a restricted passage for supplying fluid pressure in said bore to act against said surface, said valve being moved toward its seat by fluid pressure acting on said surface.

3. In a hydraulic fuse, a body member providing a valve seat, a valve for said seat spring biased to open position and having a central bore closed at the inner end thereof providing a surface subjected to fluid pressure tending to seat said valve, a stud fixed to said body and extending into said bore and providing an annular clearance therefrom to provide a restricted passage for supplying fluid pressure in said bore to act against said surface, a conduit through said stud and a second valve to control said conduit provided with a spring to maintain the same closed during movement of said first valve toward its seat and permit opening to relieve said bore during movement of said first valve away from its seat, said valve being moved toward its seat by fluid pressure acting on said surface.

4. In a hydraulic fuse, a body providing a valve seat, a valve for engaging said seat spring biased to open position and having a bore therein closed at the inner end thereof providing a surface subjected to fluid pressure tending to seat said valve, a stud fastened to said body extending into said bore and providing an annular clearance therefrom to provide a restricted passage for supplying fluid pressure to said surface, said stud having a conduit therethrough, a closure for said conduit having a passage therethrough to said bore and providing a valve seat, a second valve for engaging said seat spring urged to closed position during movement of said first valve toward its seat and permit opening to relieve said bore during movement of said first valve away from its seat.

ROBERT STEVENSON.

REFERENCES CITED

The following references are of record in the file of this patent:

UNITED STATES PATENTS

| Number | Name | Date |
|---|---|---|
| 963,385 | Oleson | July 5, 1910 |
| 1,105,255 | Caskey | July 28, 1914 |
| 2,179,144 | Buttner | Nov. 7, 1939 |
| 2,289,946 | Weatherhead | July 14, 1942 |
| 2,307,949 | Phillips | Jan. 12, 1943 |
| 2,354,161 | Waterman | July 18, 1944 |